United States Patent
Asai (10) Patent No.: US 11,183,806 B2
(45) Date of Patent: Nov. 23, 2021

(54) DC MOTOR BRUSH HOLDER ASSEMBLY

(71) Applicant: DENSO CORPORATION, Kariya (JP)

(72) Inventor: Motoyoshi Asai, Kariya (JP)

(73) Assignee: DENSO CORPORATION, Kariya (JP)

( * ) Notice: Subject to any disclaimer, the term of this patent is extended or adjusted under 35 U.S.C. 154(b) by 30 days.

(21) Appl. No.: 16/876,541

(22) Filed: May 18, 2020

(65) Prior Publication Data

US 2020/0366041 A1 Nov. 19, 2020

(30) Foreign Application Priority Data

May 16, 2019 (JP) .............................. JP2019-093190

(51) Int. Cl.
*H01R 39/38* (2006.01)
*H02K 13/00* (2006.01)
*H01R 39/04* (2006.01)

(52) U.S. Cl.
CPC ............ *H01R 39/383* (2013.01); *H01R 39/04* (2013.01); *H01R 39/385* (2013.01); *H02K 13/006* (2013.01)

(58) Field of Classification Search
CPC ...... H02K 5/148; H01R 39/381; H01R 39/40; H01R 39/38; H01R 39/383
See application file for complete search history.

(56) References Cited

U.S. PATENT DOCUMENTS

| 4,475,053 A | * | 10/1984 | Mayer | ................... H01R 39/38 29/597 |
| 4,785,214 A | * | 11/1988 | Mummert | ............ H01R 39/381 310/239 |
| 5,252,878 A | | 10/1993 | Spellman et al. | |
| 5,689,148 A | | 11/1997 | Rubinchik | |
| 5,773,907 A | | 6/1998 | Rubinchik | |

FOREIGN PATENT DOCUMENTS

KR 10-1904644 B1 10/2018

* cited by examiner

*Primary Examiner* — Dang D Le
(74) *Attorney, Agent, or Firm* — Oliff PLC (57) ABSTRACT

A bus bar engaged with each brush holder and electrically connected to positive brushes. A rotor has coils and protrusions extending in an outward direction and electrically connecting the coils to commutator segments. Each brush portion end surface faces the outward direction, the bus bar has an engagement portion with an end facing the inward direction, and the end of the engagement portion is further in the outward direction than the end surface portion. The brush has an end facing the first direction, the bus bar has an end facing a second direction, and the end of the bus bar is further in the second direction than the end of the brush facing the first direction. Each protrusion end faces the second direction, and the end of the bus bar facing the first direction is further in the second direction than the end of the protrusion facing the second direction.

6 Claims, 6 Drawing Sheets

DC MOTOR BRUSH HOLDER ASSEMBLY

CROSS-REFERENCE TO RELATED APPLICATION

This application is based on and claims the benefit of priority from earlier Japanese Patent Application No. 2019-093190 filed May 16, 2019, the description of which is incorporated herein by reference.

TECHNICAL FIELD

The present disclosure relates to a part of a DC motor with brushes, and more particularly, to a brush holder assembly including brush holders and members near the holders.

BACKGROUND

Some motors with brushes have a structure described as follows. A motor with brushes includes a rotor, three positive brushes and three negative brushes, six brush holders corresponding one-to-one to the brushes, and a bus bar.

The rotor is installed rotatably about a predetermined axis and includes commutator segments, which are electric conductors, on its outer peripheral surface. The brushes are electric conductors positioned outward from the rotor in the radially outward direction. The brush holders accommodate the brushes in a manner to allow the brushes to protrude inward and come into sliding contact with the commutator.

The rotor has, at positions rearward from the brush holders in one of the axial directions, coils for generating magnetic force and protrusions that electrically connect the coils to the commutator segments. The protrusions extend in the radially outward direction. The bus bar is an electric conductor engaged with each brush holder and electrically connected to the positive brushes.

Such a motor with brushes is described in Korean Patent No. 101904644.

SUMMARY

A DC motor brush holder assembly according to the present disclosure includes a rotor, brushes including a plurality of positive brushes and a plurality of negative brushes, brush holders, and a bus bar. Hereinafter, the lengthwise directions of a predetermined axis are defined as axial directions, one of the axial directions as a first direction, another one of the axial directions as a second direction, a direction radially toward the axis as a radially inward direction, and a direction radially away from the axis as a radially outward direction.

The rotor is installed on the axis rotatably about it and includes a plurality of commutator segments that are electric conductors on its outer peripheral surface. The brushes are electric conductors positioned outward from the rotor in the radially outward direction. The brush holders correspond to the brushes and accommodate the brushes in a manner to allow the brushes to protrude radially inward and come into sliding contact with the commutator segments. The bus bar is an electric conductor having engagement portions engaged with the brush holders, and electrically connected to the positive brushes.

The rotor has, at positions further in the first direction than the brush holder is, coils for generating magnetic force and protrusions that are electric conductors extending in the radially outward direction and electrically connecting the coils to the commutator segments.

The bus bar is arranged as described below. The end of the engagement portion facing radially inward direction is positioned further radially outward than the end surface of the predetermined portion of each brush facing in the radially outward direction is. The end of the bus bar facing in the second direction is positioned further in the second direction than the end of the brush facing in the first direction is. The end of the bus bar facing in the first direction is positioned further in the second direction than the ends of the protrusions facing in the second direction are.

DETAILED DESCRIPTION OF THE PREFERRED EMBODIMENTS

The motor with brushes described in Korean Patent No. 101904644, which includes the three positive and the three negative brushes, can have a lower current density per brush compared with a motor with brushes having less than three positive and less than three negative brushes. The lower current density can prolong the service life of the brushes. However, the present inventors have found the challenges described below.

In the motor with brushes described above, the bus bar is arranged immediately radially outward from the protrusions, i.e., positioned in a manner to face the radially outward end of each protrusion. If the rotation of the motor with brushes continues for more than a desired period of time due to a start switch failure or some other reason, the resulting centrifugal force or heat may cause a protrusion to be damaged by centrifugal force.

Such damage may bring the protrusion into contact with the bus bar. The contact between the protrusion and the bus bar forms an unintended abnormal closed circuit because of the electrical connection between the protrusion and the coil and between the bus bar and the positive brushes. The formation of the abnormal closed circuit may cause problems such as continuous energization, electrical leakage, or a reduction in torque.

The present disclosure has been accomplished on the basis of these findings. An object of the disclosure is to reduce the likelihood of a protrusion coming into contact with the bus bar even if the protrusion suffers damage due to centrifugal force.

A DC motor brush holder assembly according to the present disclosure includes a rotor, brushes including a plurality of positive brushes and a plurality of negative brushes, brush holders, and a bus bar. Hereinafter, the lengthwise directions of a predetermined axis are defined as axial directions, one of the axial directions as a first direction, another one of the axial directions as a second direction, a direction radially toward the axis as a radially inward direction, and a direction radially away from the axis as a radially outward direction.

The rotor is installed on the axis rotatably about it and includes a plurality of commutator segments that are electric conductors on its outer peripheral surface. The brushes are electric conductors positioned outward from the rotor in the radially outward direction. The brush holders correspond to the brushes and accommodate the brushes in a manner to allow the brushes to protrude radially inward and come into sliding contact with the commutator segments. The bus bar is an electric conductor having engagement portions engaged with the brush holders, and electrically connected to the positive brushes.

The rotor has, at positions further in the first direction than the brush holder is, coils for generating magnetic force and protrusions that are electric conductors extending in the radially outward direction and electrically connecting the coils to the commutator segments.

The bus bar is arranged as described below. The end of the engagement portion facing radially inward direction is positioned further radially outward than the end surface of the predetermined portion of each brush facing in the radially outward direction is. The end of the bus bar facing in the second direction is positioned further in the second direction than the end of the brush facing in the first direction is. The end of the bus bar facing in the first direction is positioned further in the second direction than the ends of the protrusions facing in the second direction are.

According to the present disclosure, the end of the engagement portion of the bus bar facing radially inward is positioned further radially outward than the end surface of the predetermined portion of each brush facing in the radially outward direction is, and this arrangement enables the brush and the bus bar to avoid interference with each other. Thus, the end of the bus bar facing in the second direction may be positioned further toward the second direction than the end of the brush facing in the first direction is. The arrangement facilitates positioning the entire bus bar away from the protrusions in the second direction. Thus, the end of the bus bar facing in the first direction may be positioned further toward the second direction than the end of each protrusion facing in the second direction is. The arrangement prevents the bus bar from being placed at a position immediately outward from each protrusion in the radially outward direction, i.e., at a position facing each protrusion and outward from the protrusion in the radially outward direction. In this arrangement, even if a protrusion suffers centrifugal damage, the protrusion is less likely to come into contact with the bus bar.

Since the end of the bus bar facing in the second direction is positioned further toward the second direction than the end of each brush facing in the first direction is, the bus bar is fitted in the brush holder assembly in a positional relationship in which the brush and the bus bar overlap each other as viewed in the radially inward direction. This arrangement allows a reduction in the axial dimension of the brush holder assembly, thus improving the mountability of the brush holder assembly in a DC motor.

Embodiments of the present disclosure will now be described with reference to the drawings. However, the present disclosure is not limited to the embodiments. The disclosure may be modified as appropriate without departing from the scope of the disclosure.

First Embodiment

Figure 6:
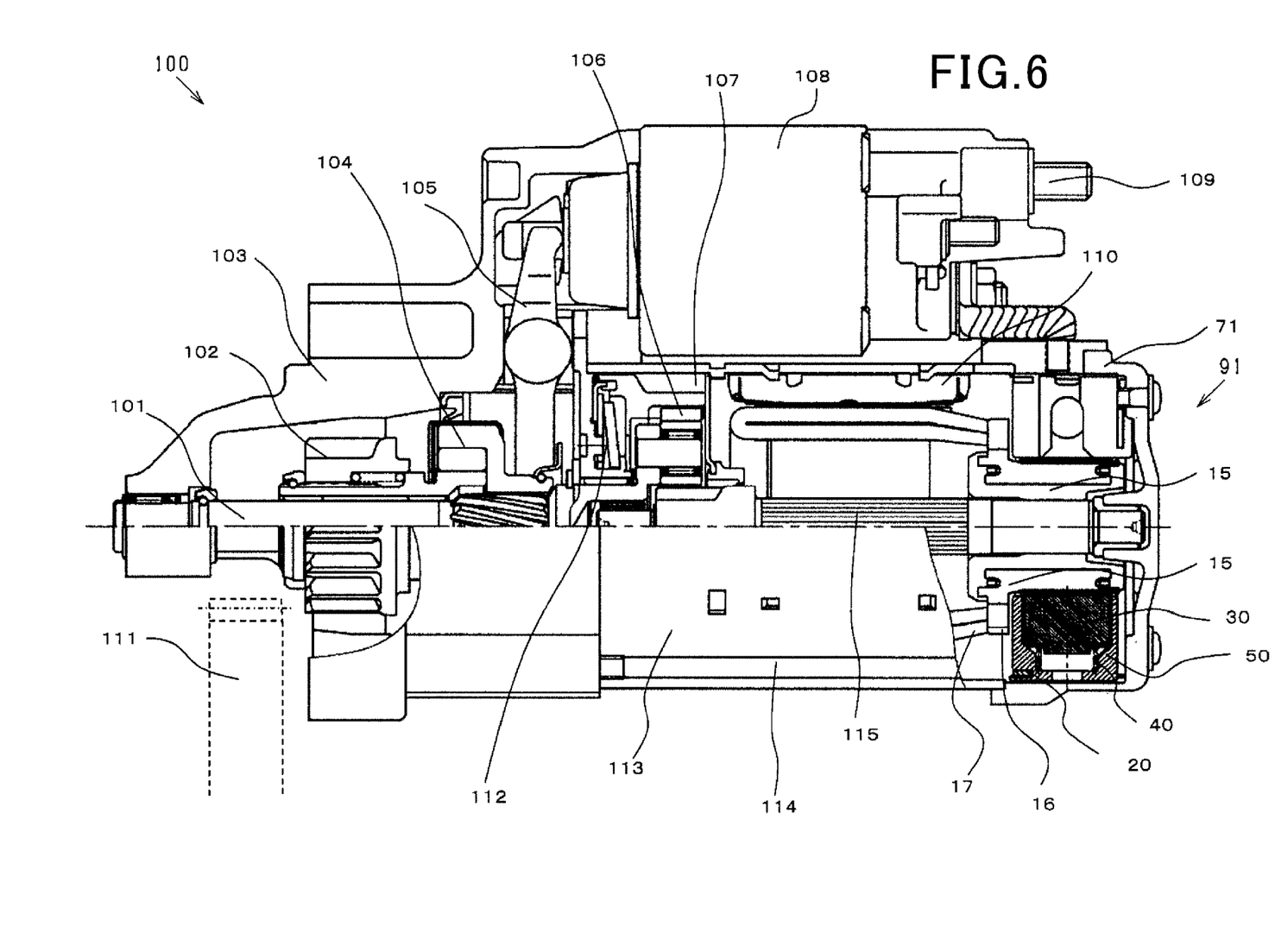
FIG. 6 is a sectional side view of the brush holder assembly and surroundings of the assembly.

FIG. 6 is a sectional side view of a brush holder assembly 91 and surroundings of the assembly 91 according to the present embodiment. In addition to the brush holder assembly 91, an engine starter 100 (DC motor) includes a driveshaft 101, a pinion gear 102, a housing 103, a clutch 104, a lever 105, a planetary gear 106, an internal gear 107, a switch 108, a bolt 109, a permanent magnet 110, a ring gear 111, a center bearing 112, a yoke 113, a through bolt 114, and an armature shaft 115. However, the components in the starter 100 other than the brush holder assembly 91 are similar to those known in the art, and thus will not be described.

Figure 1:
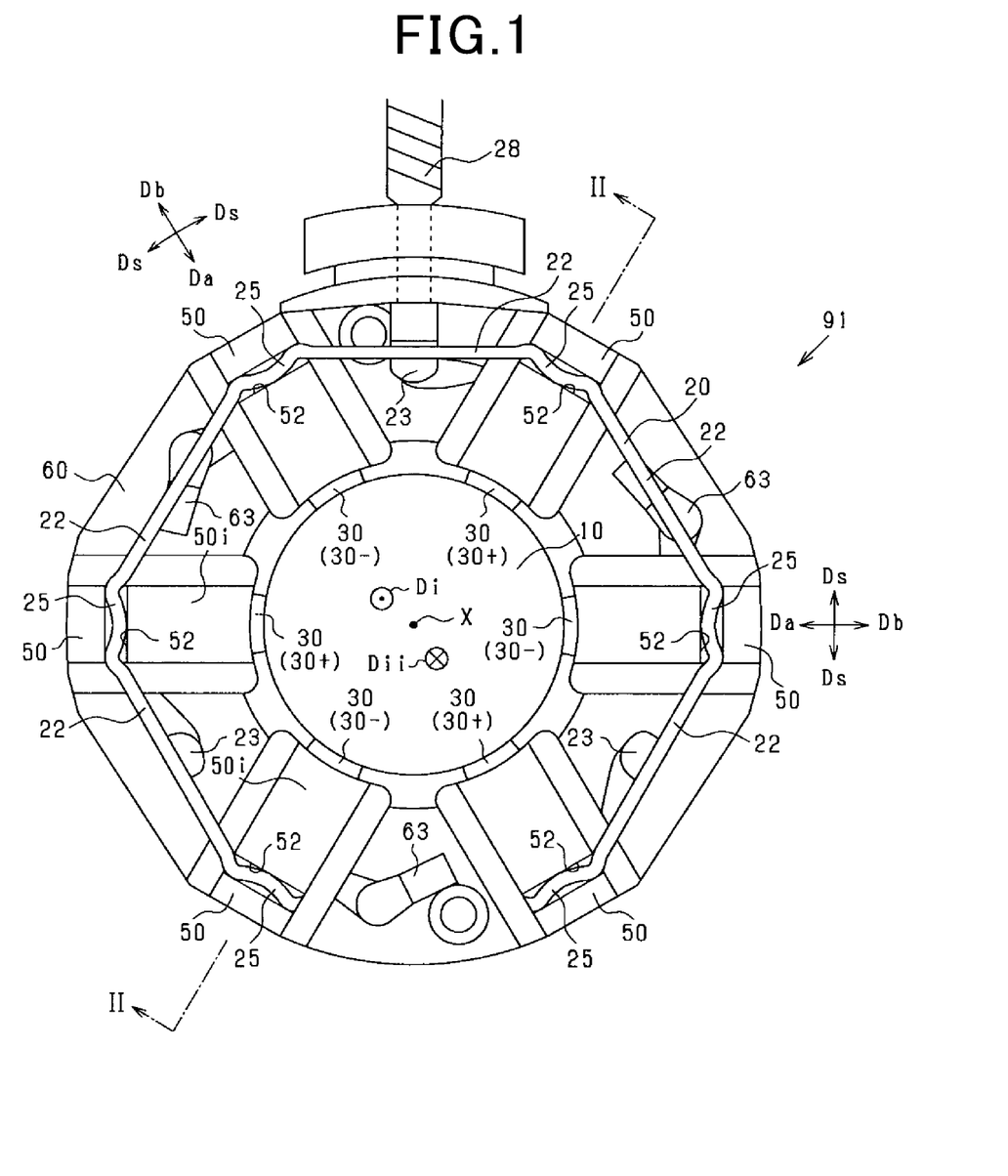
FIG. 1 is a sectional view of a brush holder assembly according to a first embodiment as viewed in a second direction.

FIG. 1 is a side view of the brush holder assembly 91 according to the present embodiment. The brush holder assembly 91 includes a rotor 10, a bus bar 20, brushes 30 consisting of three positive brushes 30+ and three negative brushes 30−, a total of six brush holders 50, and a plate 60. The brush holder assembly 91 of the DC motor also includes a lead wire 28 and wires 23 and 63. The bus bar 20 has long sections 22 and short sections 25. In the present embodiment, the short sections 25 correspond to engagement portions in the present disclosure. The brush holders 50 each have a recessed engagement groove 52.

Hereinafter, the lengthwise directions of a predetermined axis X are defined as axial directions, one of the axial directions as a first direction Di, and another one of the axial directions as a second direction Dii. The direction toward the axis X is defined as a radially inward direction Da, and the direction radially away from the axis X is defined as a radially outward direction Db. The radially inward direction Da and the radially outward direction Db are defined as radial directions. The tangential directions of the circumference of the axis X are defined as lateral directions Ds.

The rotor 10 is installed on the axis X rotatably about the axis X. Each brush 30 is an electric conductor and positioned outward from the rotor 10 in the radially outward direction Db. More specifically, the positive brushes 30+ and the negative brushes 30− are spaced alternately around the axis X.

The brush holders 50 are insulators such as resin and correspond one-to-one to the brushes 30. Each brush holder 50 has the shape of a closed-bottom cylinder opening in the radially inward direction Da, and accommodates a brush 30 in a manner to allow the brush 30 to protrude in the radially inward direction Da. The engagement groove 52 of the brush holder 50 is formed in its end surface 50i facing in the first direction Di. The engagement groove 52 extends in the lateral directions Ds, and opens in the first direction Di and at both sides of the brush holder 50 facing in the lateral directions Ds.

The bus bar 20 is an electric conductor and substantially C-shaped as viewed in the axial directions (Di, Dii). More specifically, the bus bar 20 has a substantial C-shape formed by removing one long section 22 from a dodecagon with short sections 25 and long sections 22 alternating circumferentially. The short section 25 has a circumferential length shorter than the long section 22. Each short section 25, which is bent, is fitted in the engagement groove 52 and engaged with both the inner side surfaces of the engagement groove 52. The bend and the engagement will be described in detail later.

The plate 60 is a disc-shaped electric conductor having a central hole. The plate 60 is engaged with the brush holders 50 on their ends facing in the second direction Dii.

The lead wire 28, the bus bar 20, the wires 23, and the positive brushes 30+ form a part of the positive side of a power supply circuit that supplies the rotor 10 with direct current. More specifically, the lead wire 28 is electrically connected to the bus bar 20, and the bus bar 20 is electrically connected to the positive brushes 30+ via the wires 23.

The negative brushes 30−, the wires 63, and the plate 60 form a part of the negative side (ground side) of the power supply circuit that supplies the rotor 10 with direct current. More specifically, the negative brushes 30− are electrically connected to the plate 60 via the wires 63.

Figure 2:
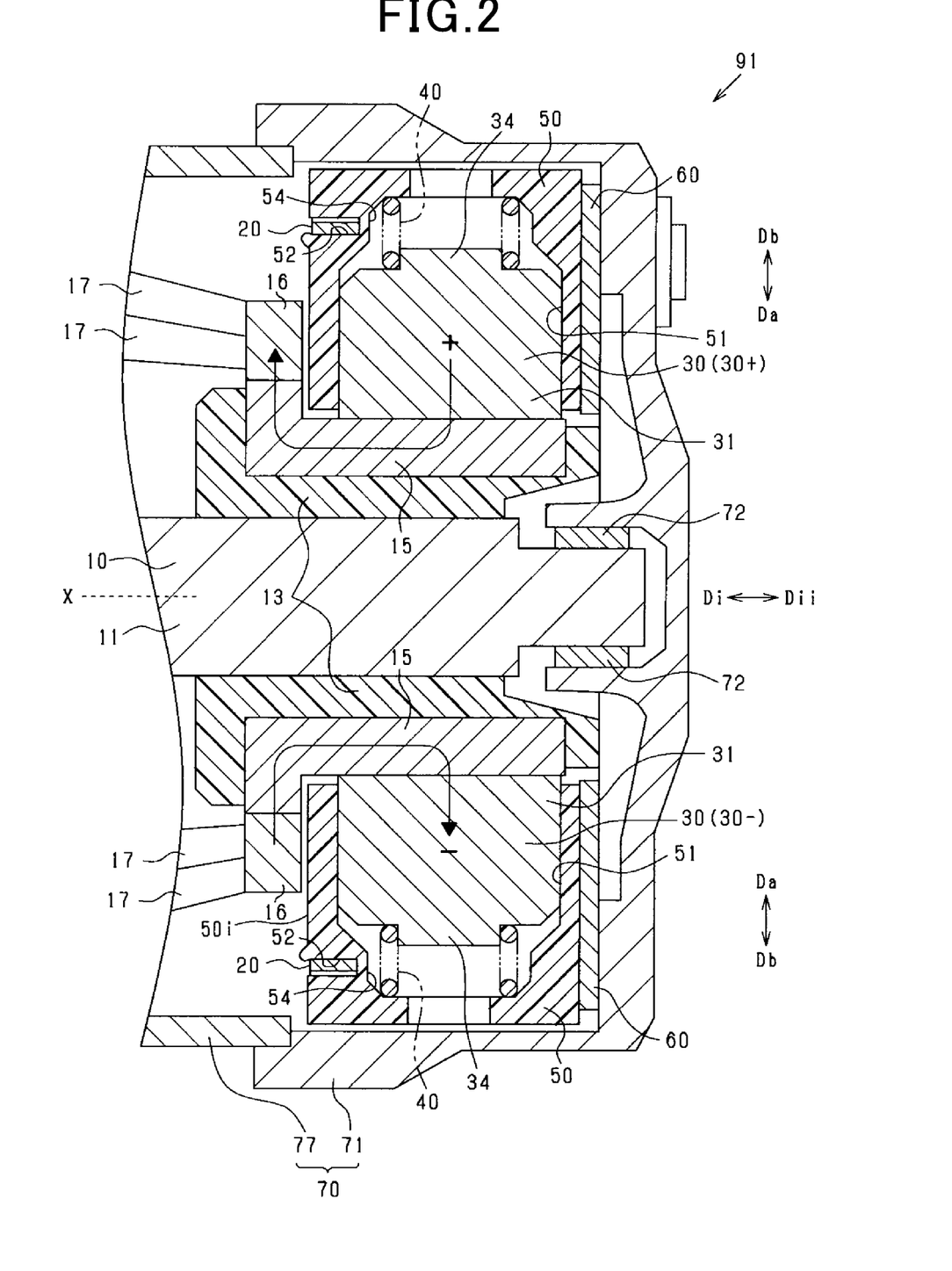
FIG. 2 is a sectional view taken along a line II-II shown in FIG. 1.

FIG. 2 is a sectional view of the brush holder assembly 91 as viewed in a lateral direction Ds. More specifically, FIG. 2 shows a cross section taken along a line II-II shown in FIG. 1. The brush holder assembly 91 further includes springs 40 and a frame 70. The rotor 10 includes a shaft 11, a base portion 13, a plurality of commutator segments 15, a plurality of protrusions 16, and a plurality of coils 17. The frame 70 includes a main frame 77 and an end frame 71. The end frame 71 and the shaft 11 have a bearing 72 between them. Each brush 30 has a brush main part 31 and a projection 34. In the present embodiment, the brush main part 31 corresponds to a predetermined portion of a brush in the present disclosure. Each brush holder 50 has a brush chamber 51 and a spring chamber 54.

The main frame 77 is a cylindrical electric conductor positioned outward from the coils 17 in the radially outward direction Db. The end frame 71 is a cylindrical electric conductor positioned outward from the bus bar 20, the brush holders 50, and the plate 60 in the radially outward direction Db, with its bottom closed at the end facing in the second direction Dii. The end of the end frame 71 facing in the first direction Di is fitted to the end of the main frame 77 facing in the second direction Dii. The inner bottom surface of the end frame 71 abuts the plate 60. Each of the main frame 77, the end frame 71, and the plate 60 is at ground potential.

The brush chamber 51 is a space for accommodating the brush 30, and the spring chamber 54 is a space for accommodating the spring 40. The brush chamber 51 has a width in the axial directions (Di, Dii) substantially the same as the width of the brush 30 in the axial directions (Di, Dii), and greater than the width of the spring chamber 54 in the axial directions (Di, Dii). Thus, in the brush holder 50, the wall across the spring chamber 54 in the axial directions (Di, Dii) is thicker than the wall across the brush chamber 51 in the axial directions (Di, Dii). The engagement groove 52 is formed in the thick wall.

The brush main part 31 is substantially rectangular as seen in the lateral direction Ds. The projection 34 extends in the radially outward direction Db from the middle of the length of the brush main part 31 along the axial directions (Di, Dii). The brush main part 31 has an end surface 31b facing in the radially outward direction Db, and the spring 40 is placed between the end surface 31b and the inner bottom surface of the brush holder 50. The end of each spring 40 facing in the radially inward direction Da surrounds the projection 34. The spring 40 has a width in the axial directions (Di, Dii) that is smaller than the width of the brush 30 in the axial directions (Di, Dii). The spring 40 urges the brush 30 in the radially inward direction Da to bring the end surface of the brush 30 facing in the radially inward direction Da into sliding contact with the commutator segments 15.

The components (11, 13 to 17) that form the rotor 10 rotate about the axis X as one unit. More specifically, the shaft 11 is rotatably supported by the bearing 72. The base portion 13 is a cylindrical insulator such as resin and fixed to the shaft 11 by press-fitting. Each commutator segment 15 is an electric conductor and fixed to the outer periphery of the base portion 13.

The number of commutator segments 15 in the present embodiment is about 20 to 30, and the commutator segments 15 are spaced circumferentially and arranged about the axis X. The base portion 13 intervenes between the commutator segments 15, and the base portion 13 electrically isolates the commutator segments 15 from each other. As the rotor 10 rotates, the commutator segments 15 come into sliding contact with the positive brushes 30+ and the negative brushes 30− alternately.

The protrusions 16 are electric conductors corresponding one-to-one to the commutator segments 15. Each protrusion 16 is electrically connected and fixed to the end of the corresponding commutator segment 15 facing in the first direction Di. The protrusion 16 is positioned further is in the first direction Di than the brush holder 50 is and extends in the radially outward direction Db.

One end of each coil 17 is electrically connected to one protrusion 16, while the other end is electrically connected to another protrusion 16. In other words, each coil 17 has an end electrically connected to a first commutator segment 15 via its protrusion 16, and an end electrically connected to a second commutator segment 15 via its protrusion 16. When the first commutator segment 15 comes into sliding contact with a positive brush 30+, and the second commutator segment 15 comes into sliding contact with a negative brush 30−, a current flows from the end to the end. Conversely, when the first commutator segment 15 comes into sliding contact with a negative brush 30−, and the second commutator segment 15 comes into sliding contact with a positive brush 30+, a current flows from the end to the end.

In this manner, the rotation of the rotor 10 causes a current to flow through the coils 17. The current leads to magnetic force. The magnetic force cooperates with the magnetic force of the permanent magnet 110 fixed to the inner peripheral surface of the main frame 77 to apply torque to the rotor 10.

Figure 3:
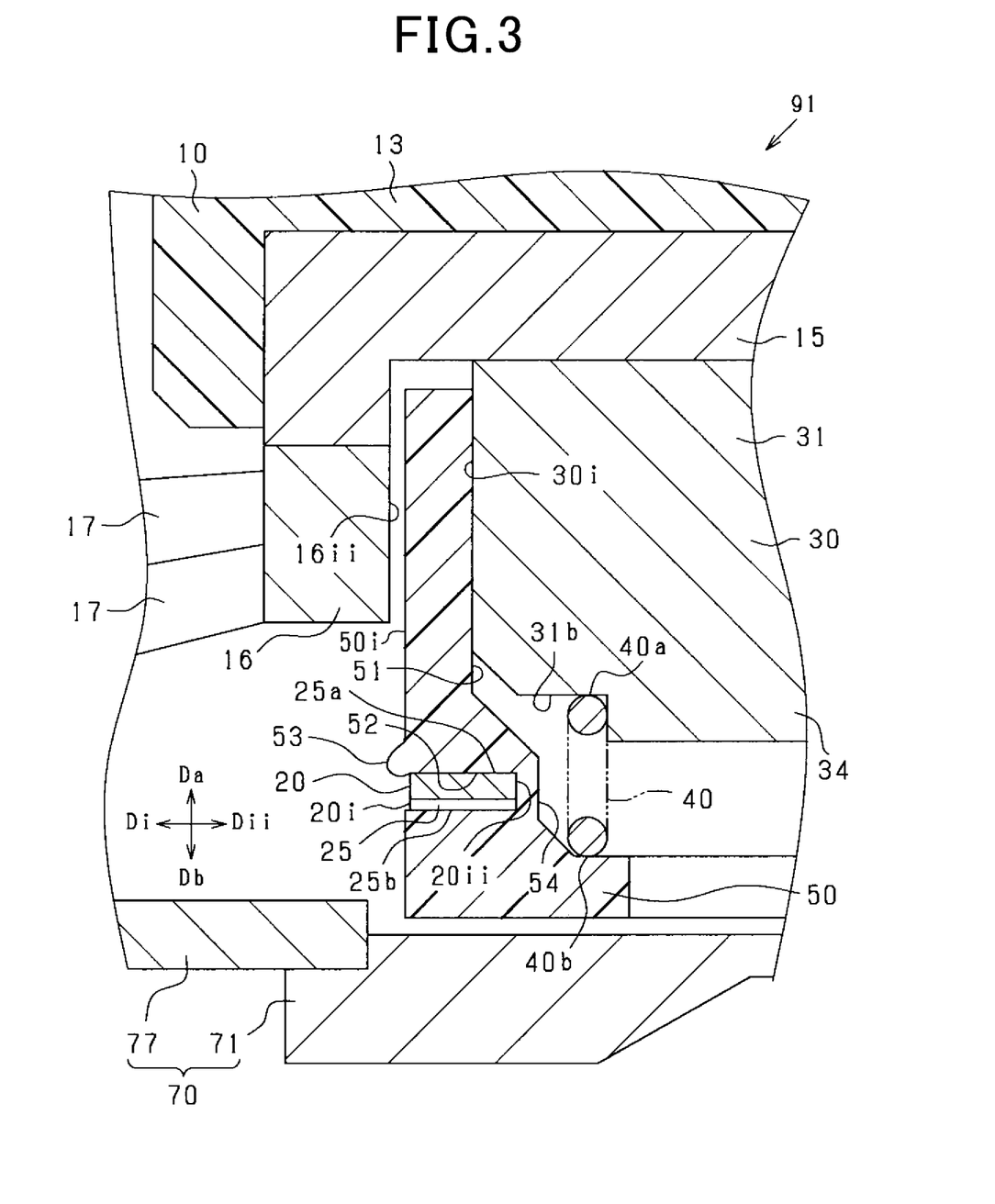
FIG. 3 is an enlarged view of a part of FIG. 2.

FIG. 3 is an enlarged view of a part of FIG. 2. The engagement groove 52 has a depth in the axial directions (Di, Dii) that is greater than the width of the bus bar 20 in the axial directions (Di, Dii). Thus, the bus bar 20 is fitted in the engagement groove 52 in the axial directions (Di, Dii). The brush holder 50 has, on the end surface 50i facing in the first direction Di, a raised portion 53 formed in a manner to partially cover the engagement groove 52 opening in the first direction Di. The covering prevents the bus bar 20 from accidentally coming out of the engagement groove 52.

The arrangement of the bus bar 20 will now be described. An end 25a of the short section 25 facing in the radially inward direction Da is positioned further in the radially outward direction Db than the end surface 31b of the brush main part 31 is, which faces in the radially outward direction Db. In this arrangement, even if the brush 30 and the bus bar 20 are shifted away from each other in the radial directions (Da, Db), interference with each other can be avoided. Thus, an end 20ii of the bus bar 20 facing in the second direction Dii can be positioned further in the second direction Dii than an end 30i of the brush 30 facing in the first direction Di is.

The arrangement facilitates positioning the entire bus bar 20 away from the protrusions 16 in the second direction Dii. Thus, an end 20i of the bus bar 20 facing in the first direction Di can be positioned further in the second direction Dii than an end 16ii of each protrusion 16 facing in the second direction Dii is. The arrangement prevents the bus bar 20 from being placed at a position immediately outward from each protrusion 16 in the radially outward direction Db, i.e., at a position facing each protrusion 16 and outward from the protrusion 16 in the radially outward direction Db.

The end 25a of the short section 25 facing in the radially inward direction Da is positioned further in the radially outward direction Db than an end 40a of the spring 40 facing in the radially inward direction Da is, and an end 25b of the short section 25 facing in the radially outward direction Db is positioned further in the radially inward direction Da than an end 40b of the spring 40 facing in the radially outward direction Db is. Thus, the short section 25 of the bus bar 20 is positioned in the axial directions (Di, Dii) with respect to the spring 40.

Figure 4:
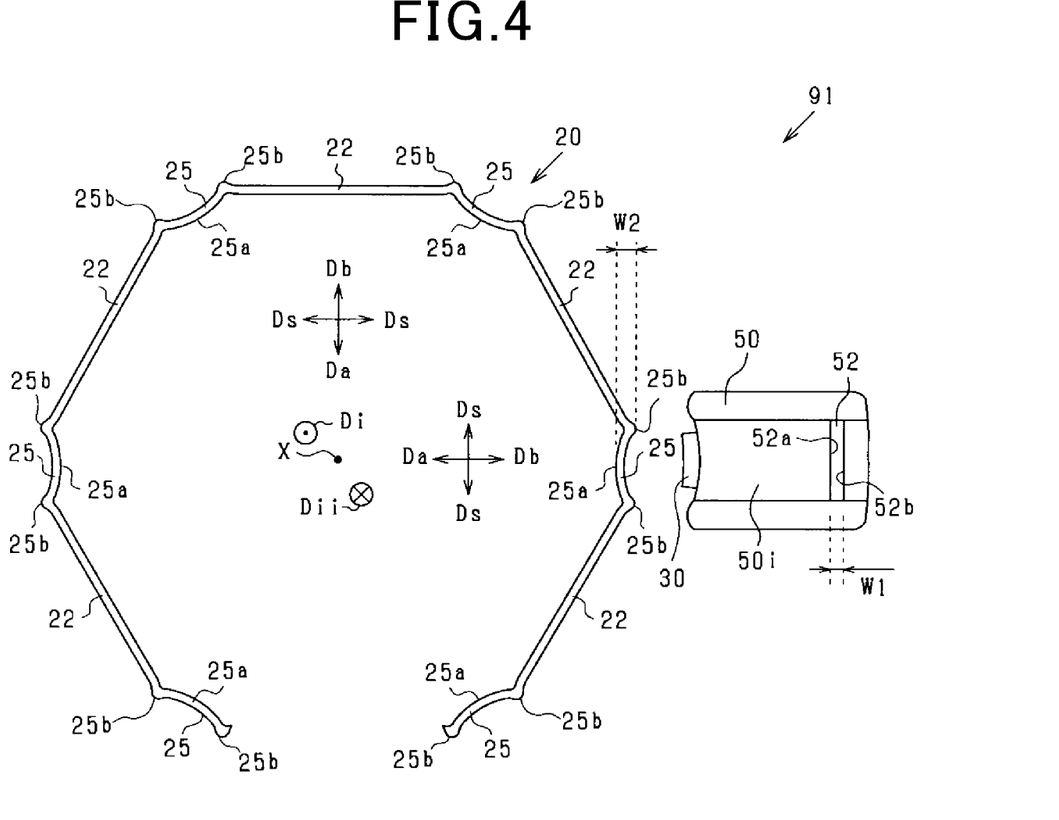
FIG. 4 is a side view of a bus bar and a brush holder separated from each other as viewed in the second direction.

FIG. 4 is a side view of the bus bar 20 and the brush holder 50 separated from each other as viewed in the second direction Dii. The short sections 25 are bent as viewed in the second direction Dii. The end 25a of each short section 25 facing in the radially inward direction Da is provided at the middle of the length of the short section 25. The ends 25b of each short section 25 facing in the radially outward direction Db are provided at both ends of the length of the short section 25.

In the present embodiment, both ends of the length of each short section 25 are bent into an angle. In contrast, a part of the short section 25 between both ends is bent into a curve. The short section 25 has a width W2 in the radial directions (Da, Db), i.e., a width W2 from the end 25a of the short section 25 facing in the radially inward direction Da to the end 25b facing in the radially outward direction Db, and the engagement groove 52 has a width W1. In a natural state without external force applied to the bus bar 20, the width W2 of the short section 25 is greater than the width W1 of the engagement groove 52.

Figure 5:
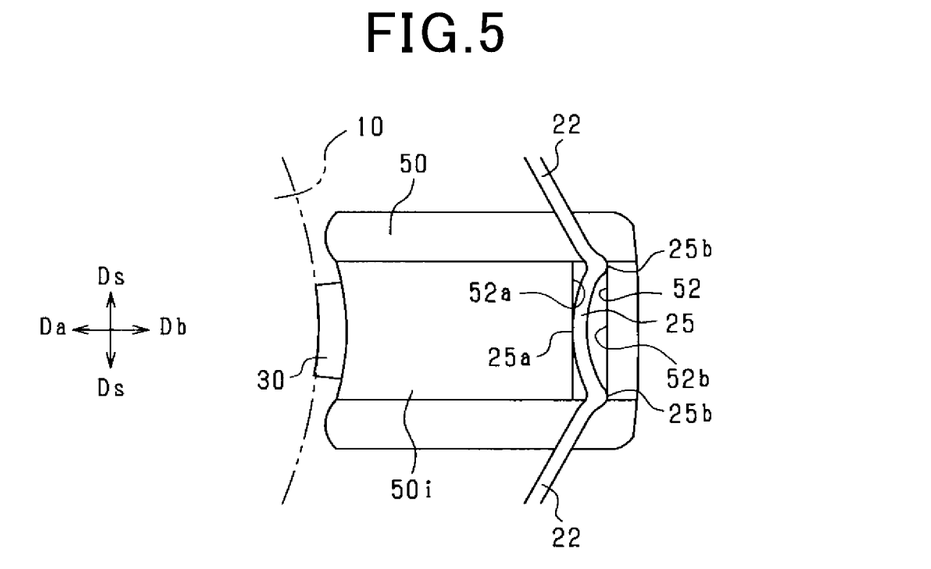
FIG. 5 is a side view of the bus bar and the brush holder as viewed in the second direction.

FIG. 5 is a side view of the bus bar 20 and the brush holder 50 in a state where short section 25 is engaged with the engagement groove 52. As described above, in a natural state, the width W2 of the short section 25 in the radial directions (Da, Db) is greater than the width W1 of the engagement groove 52 in the radial directions (Da, Db). Thus, when the short section 25 is engaged in the engagement groove 52, the end 25a of the short section 25 facing in the radially inward direction Da comes into contact with the engagement groove 52 on its inner side surface 52a situated in the radially inward direction Da, and the end 25b of the short section 25 facing in the radially outward direction Db comes into contact with the engagement groove 52 on its inner side surface 52b situated in the radially outward direction Db.

Then, the elastic force of the short section 25 presses the end 25a of the short section 25 facing in the radially inward direction Da against the inner side surface 52a of the engagement groove 52 situated in the radially inward direction Da. The elastic force also presses the end 25b of the short section 25 facing in the radially outward direction Db against the inner side surface 52b of the engagement groove 52 situated in the radially outward direction Db.

According to the present embodiment, the following effects are achieved. As described above, the bus bar 20 is prevented from being placed at a position immediately outward from the protrusions 16 in the radially outward direction Db. In this arrangement, even if a protrusion 16 suffers centrifugal damage, the protrusion 16 is less likely to come into contact with the bus bar 20. The arrangement thus prevents problems such as the formation of an abnormal closed circuit caused by the contact between the protrusion 16 and the bus bar 20. Accordingly, the arrangement prevents problems such as continuous energization, electrical leakage, or a reduction in torque caused by the formation of such an abnormal closed circuit.

In addition, the spring 40 is surrounded by a sufficient space in the axial directions (Di, Dii) because the width of the spring 40 in the axial directions (Di, Dii) is smaller than the width of the brush 30 in the axial directions (Di, Dii). The space can be effectively used by placing the bus bar 20 in this space. This effective use can avoid an increase in the size of the brush holder assembly 91 in the radially outward direction Db, as well as an increase in the size of the brush holder assembly 91 in the axial directions (Di, Dii).

In addition, the end 25b of the short section 25 facing in the radially outward direction Db is positioned further in the radially inward direction Da than the end 40b of the spring 40 facing in the radially outward direction Db is, and thus the positive-potential bus bar 20 can be spaced away from the ground-potential frame 70 positioned further in the radially outward direction Db than the bus bar 20 is.

According to the present embodiment, the following effects are also achieved. If each short section 25 had a width W2 in the radial directions (Da, Db) smaller than the width W1 of the engagement groove 52 in the radial directions (Da, Db) in a natural state of the bus bar 20, the engagement of the short section 25 with the engagement groove 52 would leave a gap between the short section 25 and at least one of the inner side surfaces of the engagement groove 52. The gap results in looseness.

However, in a natural state of the bus bar 20, the short section 25 in the present embodiment has a width W2 in the radial directions (Da, Db) greater than the width W1 of the engagement groove 52 in the radial directions (Da, Db). Thus, when the short section 25 is engaged with the engagement groove 52, the short section 25 comes into contact with both the inner side surfaces (52a, 52b) of the engagement groove 52 facing in the radial directions (Da, Db). Then, the elastic force of the short section 25 presses both ends (25a, 25b) of the short section 25 facing in the radial directions (Da, Db) against the inner side surfaces (52a, 52b) at both sides of the engagement groove 52 facing in the radial directions (Da, Db). The bus bar 20 is thus stably engaged with the engagement groove 52 without looseness.

In the axial directions (Di, Dii), the fitting of the bus bar 20 in the engagement groove 52 also stabilizes the engagement of the bus bar 20 with the engagement groove 52. In addition, the brush holder 50 has, on the end surface 50i facing in the first direction Di, the raised portion 53 formed in a manner to partially cover the engagement groove 52 opening in the first direction Di. The raised portion 53 also stabilizes the engagement of the bus bar 20 with the engagement groove 52.

Second Embodiment

A second embodiment will now be described. In this and subsequent embodiments, the same or corresponding components as in the previous embodiments are designated by the same reference numerals. However, brush holder assemblies in different embodiments are designated by different reference numerals. In the present embodiment, differences from the first embodiment will be mainly described.

Figure 7:
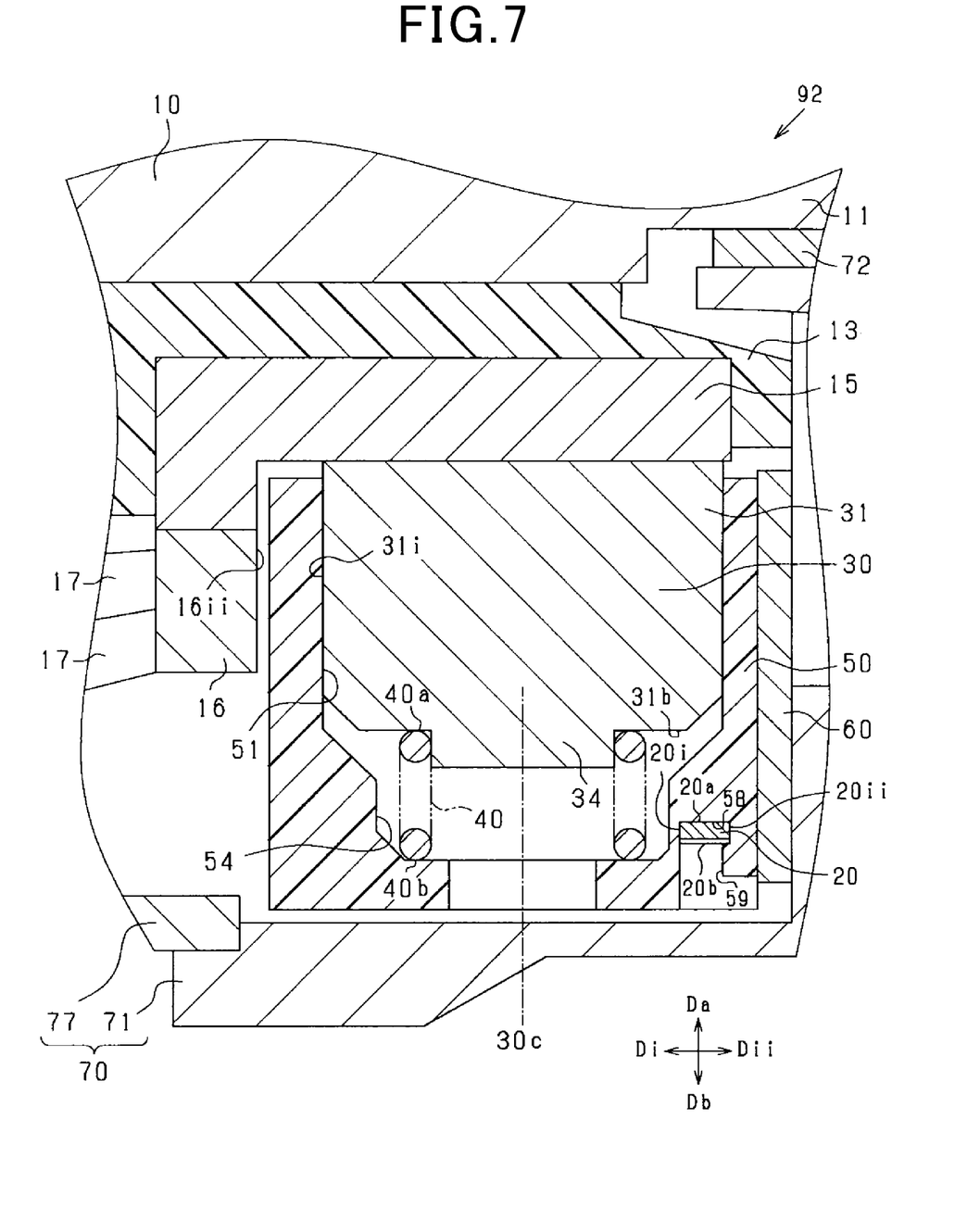
FIG. 7 is a sectional view of a brush holder assembly according to a second embodiment as viewed in the second direction.

FIG. 7 is a side view of a brush holder assembly 92 according to the present embodiment. Each brush holder 50 does not have the engagement groove 52 in its end surface facing in the first direction Di. Instead of the engagement groove 52, the brush holder 50 has an engagement recess 58 in its end surface facing in the radially outward direction Db. The engagement recess 58 extends in the lateral directions Ds, and opens in the radially outward direction Db and at both ends of the engagement recess 58 facing in the lateral directions Ds. The bus bar 20 is fitted in the engagement recess 58 and engaged with the engagement recess 58.

The width of the engagement recess 58 in the axial directions (Di, Dii) is substantially the same as the width of the bus bar 20 in the axial directions (Di, Dii). The engagement recess 58 has a raised portion 59 at a position on its inner side surface outward from the bus bar 20 in the radially outward direction Db. The raised portion 59 protrudes inward from the engagement recess 58 (in the first direction Di of the axial directions in the figure). In a natural state without external force applied to the bus bar 20, the gap between the raised portion 59 and the bottom surface of the engagement recess 58 is smaller than the width W2 of the short section 25 in the radial directions (Da, Db). The bus bar 20 is arranged so that the end 20$i$ of the bus bar 20 facing in the first direction Di is positioned further in the second direction Dii from a center line 30$c$ of the brush 30 along the axial directions (Di, Dii).

According to the present embodiment, the following effects are achieved. The entire bus bar 20 is arranged further in the second direction Dii than the center line 30$c$ of the brush 30 is along the axial directions (Di, Dii), and the arrangement shifts the bus bar 20 farther away from the protrusion 16 than in the first embodiment. Thus, if a protrusion 16 suffers centrifugal damage, the protrusion 16 is less likely to come into contact with the bus bar 20.

Other Embodiments

The first or the second embodiment may be modified as described below. The numbers of positive brushes 30+ and negative brushes 30− may be changed from three to two or four or more. The number of 20 to 30 commutator segments 15 may be increased to 30 or more or reduced to 20 or less. Both the longitudinal ends of each short section 25 may be bent into curves instead of angles.

The width W2 of the short section 25 in the radial directions (Da, Db) may be smaller than the width W1 of the engagement groove 52 in the radial directions (Da, Db). The depth of the engagement groove 52 in the axial directions (Di, Dii) may be smaller than the width of the bus bar 20 in the axial directions (Di, Dii). The bus bar 20 may protrude from the engagement groove 52 in the first direction Di to the extent that the end 20$i$ of the bus bar 20 facing in the first direction Di does not exceed, in the first direction Di, the end 16$ii$ of the protrusion 16 facing in the second direction Dii.

What is claimed is:

1. A DC motor brush holder assembly with lengthwise directions of a predetermined axis defined as axial directions, one of the axial directions as a first direction, another one of the axial directions as a second direction, a direction radially toward the axis as a radially inward direction, and a direction radially away from the axis as a radially outward direction, the DC motor brush holder assembly comprising:
    a rotor installed on the axis rotatably thereabout and including a plurality of commutator segments being electric conductors on an outer peripheral surface of the rotor;
    brushes being electric conductors including a plurality of positive brushes and a plurality of negative brushes and positioned outward from the rotor in the radially outward direction;
    brush holders corresponding to the brushes and accommodating the brushes in a manner to allow the brushes to protrude in the radially inward direction and come into sliding contact with the commutator segments;
    a bus bar being an electric conductor having engagement portions engaged with the brush holders, the bus bar electrically connected to the positive brushes; and
    the rotor has, at positions further in the first direction than the brush holders is, coils configured to generate magnetic force and protrusions being electric conductors extending in the radially outward direction and electrically connecting the coils to the commutator segments, wherein
    the bus bar is arranged in such a manner that an end of the engagement portion facing in the radially inward direction is positioned further in the radially outward direction than an end surface of a predetermined portion of the brush facing in the radially outward direction is, an end of the bus bar facing in the second direction is positioned further in the second direction than an end of the brush facing in the first direction is, and an end of the bus bar facing in the first direction is positioned further in the second direction than an end of the protrusion facing in the second direction is.

2. The DC motor brush holder assembly according to claim 1, wherein
    the brush holders each accommodates a spring configured to urge the brush in the radially inward direction, the spring having a width in the axial directions smaller than a width of the brush in the axial directions, and
    the bus bar is arranged in such a manner that an end of the engagement portion facing in the radially inward direction is positioned further in the radially outward direction than an end of the spring facing in the radially inward direction is, and an end of the engagement portion facing in the radially outward direction is positioned further inward in the radially inward direction than an end of the spring facing in the radially outward direction is.

3. The DC motor brush holder assembly according to claim 1, wherein
    with tangential directions of a circumference of the axis defined as lateral directions,
    the brush holder has, in an end surface facing in the first direction, an engagement groove extending in the lateral directions, and the engagement portion is engaged with the engagement groove.

4. The DC motor brush holder assembly according to claim 3, wherein
    the engagement groove has a depth in the axial direction, the depth being greater than a width of the engagement portion in the axial direction.

5. The DC motor brush holder assembly according to claim 3, wherein
    the engagement portion is bent when viewed in the axial directions,
    with both of the radially inward direction and the radially outward direction defined as radial directions, in a natural state without external force applied to the bus bar, the engagement portion has a width in the radial directions greater than a width of the engagement groove in the radial directions, and
    with the engagement portion engaged with the engagement groove, the engagement portion abuts inner side surfaces of the engagement groove at both sides thereof facing in the radial directions.

6. The DC motor brush holder assembly according to claim 1, wherein
the bus bar is arranged in such a manner that the end of the bus bar facing in the first direction is positioned further in the second direction from a center line of the brush along the axial direction.

* * * * *